United States Patent [19]

Holt et al.

[11] Patent Number: 4,505,222
[45] Date of Patent: Mar. 19, 1985

[54] EXTRUSION COATING APPARATUS

[75] Inventors: Anne Holt, Westfield; James Krutzler, Edison, both of N.J.

[73] Assignee: Celanese Corporation, New York, N.Y.

[21] Appl. No.: 589,961

[22] Filed: Mar. 15, 1984

[51] Int. Cl.³ .................. B05B 17/00; B05C 5/00
[52] U.S. Cl. .................. 118/304; 118/325; 118/405; 118/DIG. 18; 118/DIG. 19; 425/113
[58] Field of Search ....... 118/404, 405, 420, DIG. 18, 118/DIG. 19, 304, 325; 427/120, 163, 169, 434.6; 264/1.1; 425/113

[56] References Cited
U.S. PATENT DOCUMENTS
4,264,649 4/1981 Claypoole et al. .................. 427/163

Primary Examiner—Norman Morgenstern
Assistant Examiner—Ken Jaconetty
Attorney, Agent, or Firm—Burns, Doane, Swecker & Mathis

[57] ABSTRACT

A die assembly is provided which is suitable for the extrusion coating of elongate cores, such as optical fibers. The die assembly comprises a nozzle having an orifice therethrough. A die tip has a through-bore and is mounted such that the through-bore is alignable with the orifice to conduct a core through the through-bore and orifice. A passage is arranged for conducting a flowable coating material into and through the orifice. A hollow guide tube is slidably mounted in the through-bore and is sized to receive the core. The guide tube is positionable such that the forward end thereof is movable relative to the nozzle orifice.

9 Claims, 7 Drawing Figures

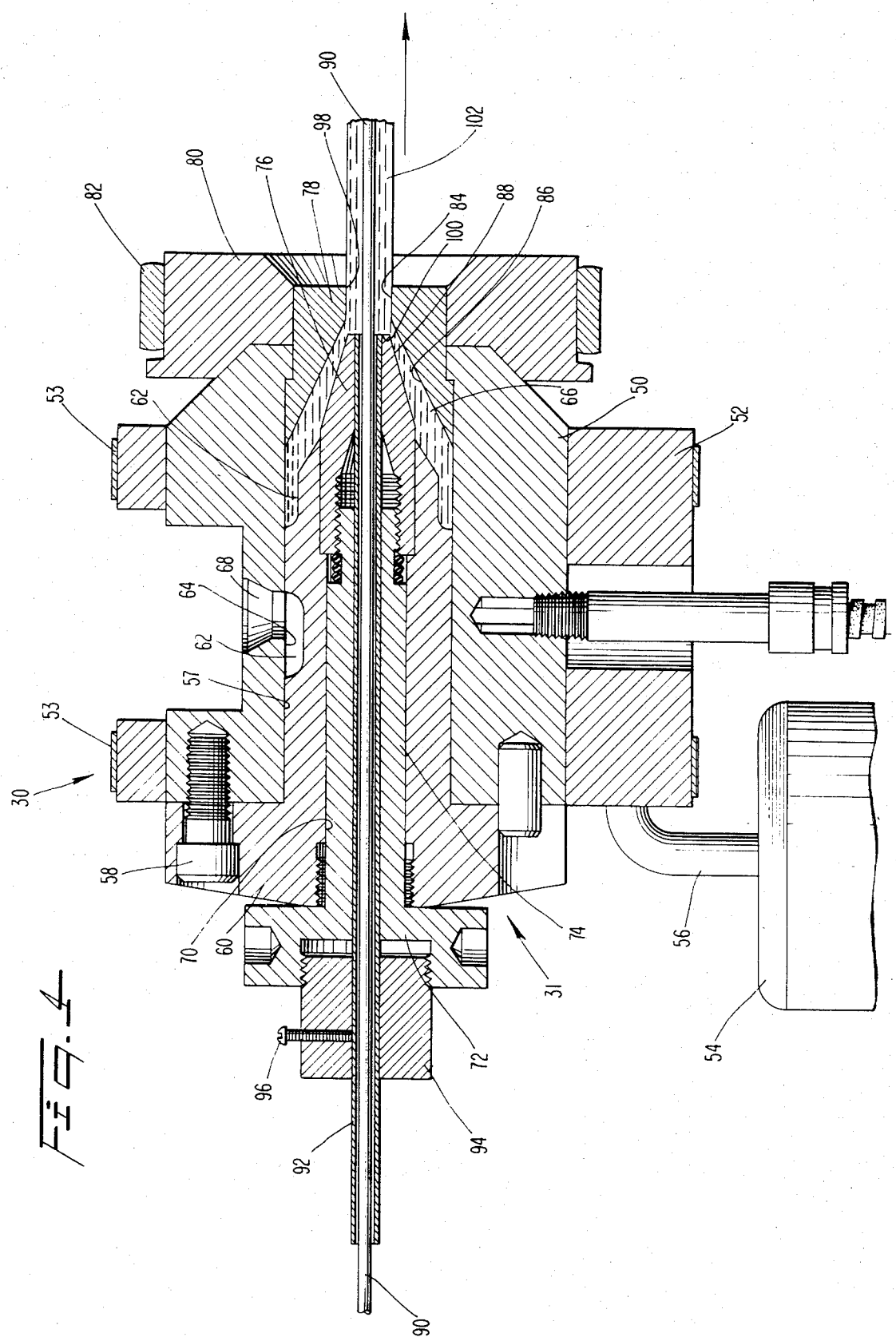

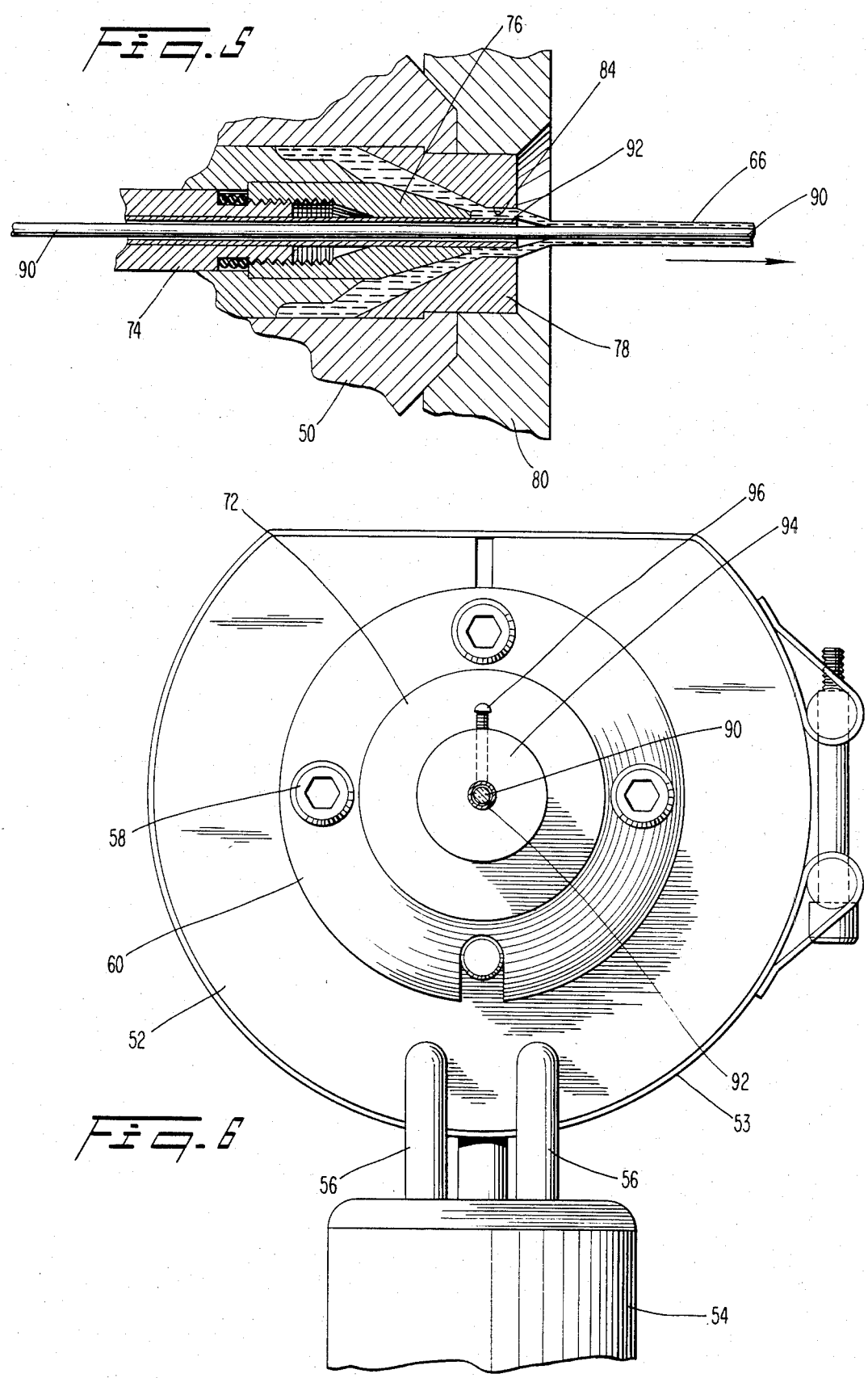

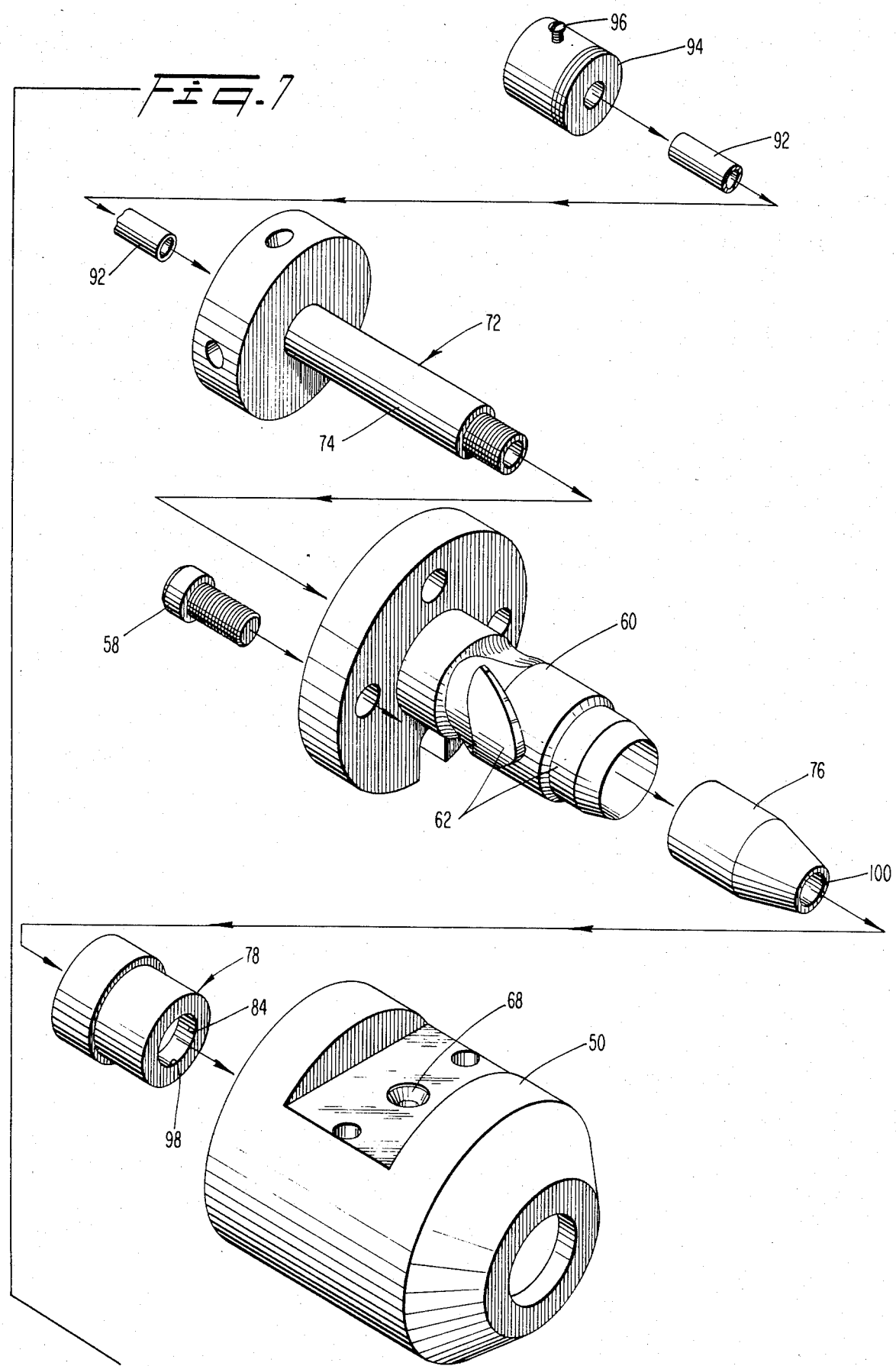

EXTRUSION COATING APPARATUS

BACKGROUND AND OBJECTS OF THE INVENTION

The present invention relates to apparatus for the coating of thin elongate elements, and in particular to the extrusion coating of optical fibers.

It is common to coat the exterior of thin elongate elements such as wire, optical fibers, etc., with a protective sheath. For example, optical glass fibers are coated with a polymer melt by passing the fiber through a die while flowing the melt onto the fiber. Conventional types of such coating dies are depicted in FIGS. 1 and 2 which illustrate a pressure coating die 10 and a sleeve coating die 12, respectively. In the pressure coating die 10, the fiber 14 is passed through a die tip 16 and then through an orifice 18 of a nozzle 20. The die tip 16 is spaced slightly rearwardly away from the nozzle orifice 18 so that polymer melt 22 can be fed through the nozzle orifice and into pressure contact with the fiber 14 as the latter exits the die tip 16. The fiber thus leaves the nozzle 20 closely coated with melt 22. The diameter of the nozzle orifice 18 corresponds to the desired outer diameter of the coating, so there is no need to draw-down the coating after leaving the die. The pressure coating technique is usually employed in cases where the polymer has no extensibility or melt strength, or where twisted bundles of wire or fibers are being coated so that the interstices are filled.

In the sleeve coating technique (FIG. 2), the discharge end 23 of the die tip 24 is flush with the discharge end 25 of the nozzle 26. The polymer melt 28 is applied in the form of a conical flow downstream of the nozzle 26 and is drawn-down to the desired outer diameter.

When converting a coating facility from one to the other of the pressure and sleeve techniques, it is necessary to exchange die assemblies, because the types of die assemblies depicted in FIGS. 1 and 2 are mutually incompatible. This results in the need to fabricate and keep on-hand multiple sets of die assemblies.

Also, in the event of a fiber breakage, it is difficult to rethread the fiber into the die tip of the types depicted in FIGS. 1 and 2 because the inlet end of the die tip through-bore is not readily accessible or visible in the usual mounting fixture, and/or because the downstream end of such through-bore may become blocked by polymer. As a result, it may be necessary to disassemble the die assembly in order to rethread the fiber.

It is, therefore, an object of the present invention to minimize or obviate problems of the type discussed above.

Another object is to enable a single die assembly to be adaptable to both pressure and sleeve coating techniques.

A further object is to provide a die assembly which facilitates the threading of the element to be coated.

SUMMARY OF THE INVENTION

These objects are achieved by the present invention which relates to a die assembly for the extrusion coating of elongate cores. The die assembly comprises a nozzle having an orifice therethrough. A through-bore is aligned with the orifice so that a core can be conducted through the through-bore and the orifice. A passage is arranged for conducting a flowable coating material into and through the orifice. A hollow guide tube is slidably mounted in the through-bore and is sized to receive the core. The guide tube is positionable such that the forward end thereof is movable relative to the nozzle orifice to vary the location of the point at which the coating material contacts the core.

The forward end of the guide tube can be positioned upstream of a downstream end of the nozzle orifice to effect a pressure coating of the core. Alternatively, the forward end of the guide tube can be positioned substantially flush with a downstream end of the nozzle orifice to effect a sleeve coating of the core.

In order to clean the forward end of the guide tube, the latter can be positioned downstream of the nozzle orifice.

THE DRAWINGS

The objects and advantages of the invention will become apparent from the following detailed description of a preferred embodiment thereof in connection with the accompanying drawings, in which like numerals designate like elements, and in which:

FIG. 4 is a longitudinal sectional view taken through a die assembly according to the present invention which is oriented for a pressure coating operation;

FIG. 5 is a longitudinal sectional view taken through a forward end of the die assembly of FIG. 4, wherein the die assembly has been oriented for a sleeve coating operation;

FIG. 6 is a rear view of the die assembly; and

FIG. 7 is an exploded perspective view of the die assembly.

DETAILED DESCRIPTION OF A PREFERRED EMBODIMENT OF THE INVENTION

A die assembly 30 according to the present invention is suitable for the extrusion coating of a continuous, thin elongate element such as a wire, strand, optical fiber, etc., for example, which will be referred to hereinafter as a "core". Any suitable melt processable coating material may be applied to the core, such as a thermotropic liquid crystalline polymer, for example. Attention is directed to commonly assigned and copending application Ser. No. 06/364,823 filed by Ide et al. on Apr. 2, 1982 for a disclosure of an optical glass fiber coated with a thermotropic liquid crystalline polymer. The disclosure of that application is incorporated by reference herein.

Figure 1:
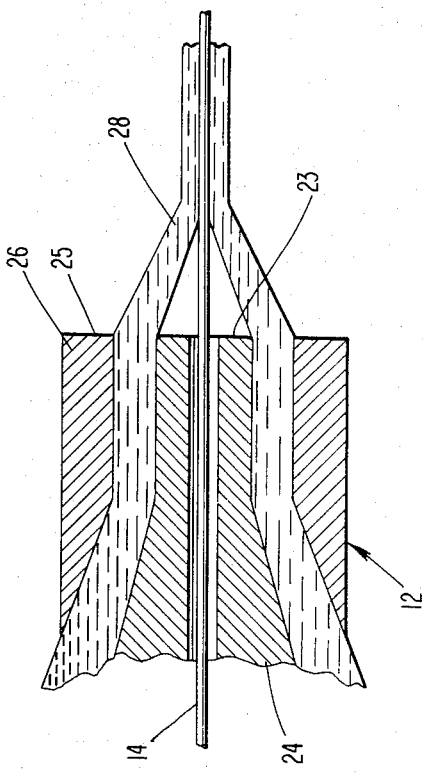
FIG. 1 is a longitudinal sectional view taken through a conventional die assembly which is oriented for a pressure coating operation.
Figure 2:
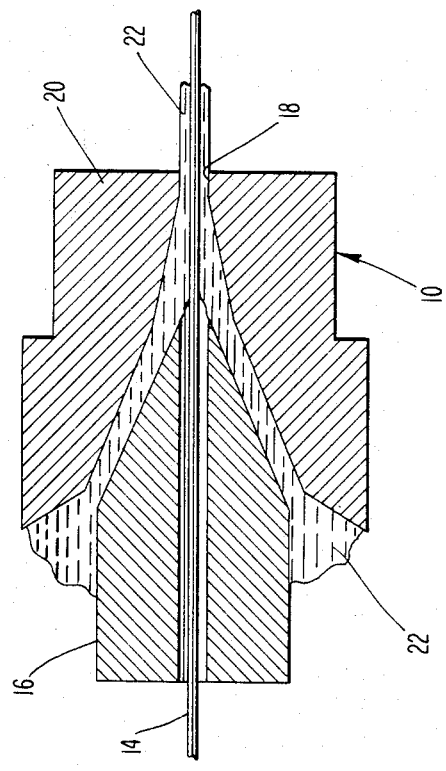
FIG. 2 is a longitudinal sectional view taken through a portion of a conventional die assembly which is oriented for a sleeve coating operation.
Figure 3:
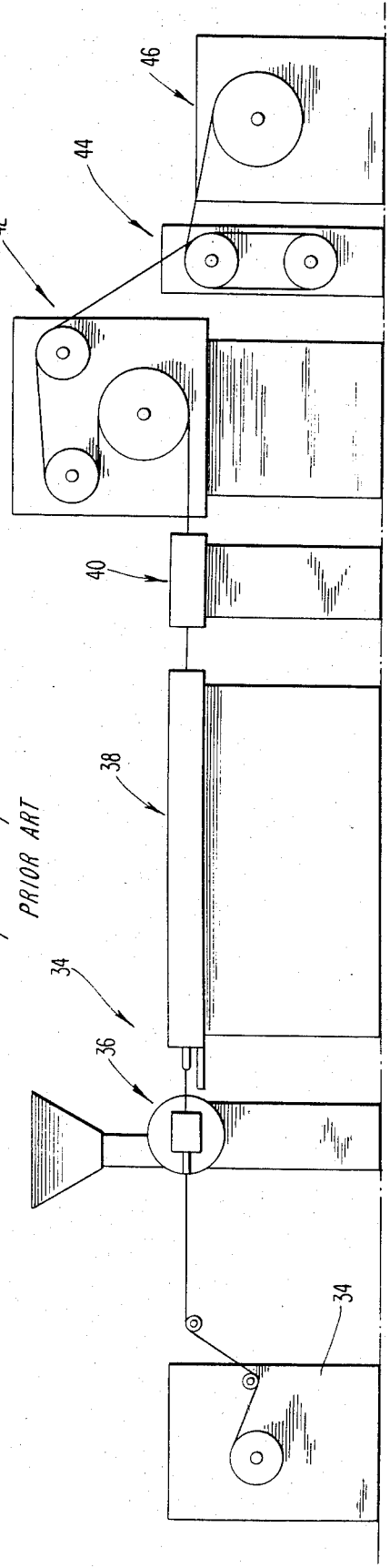
FIG. 3 is a schematic side elevational view of a conventional facility for the extrusion coating of optical fibers.

A suitable facility 32 for performing the coating process is depicted in FIG. 3. This facility 32, which is conventional, comprises an unwinding strand 34 from which the core is unwound, an extruder 36 which applies the coating, a cooling trough 38, a diameter measurement and control unit 40, a capstan 42, a dancer 44, and a take-up reel 46.

The extruder 36 includes a melt pump (not shown) and the die assembly 30 to which the melt is fed in flowing fashion.

The die assembly 30 comprises a head cartridge 50 mounted within a main heater adapter 52. The latter carries a pair of heater elements 53 and is attached to a mounting block 54 by means of support arms 56. Mounted within a bore 57 of the cartridge 50 by means of screws 58 is a hollow sleeve 60. The sleeve 60 includes external grooving 62 which, together within an internal surface 64 of the bore 57, defines passages for conducting a polymer melt 66. The melt is introduced into the passages through an inlet 68 in the cartridge 50.

Mounted within an internal bore 70 of the sleeve is a die member which comprises a die tip retainer 72 and a die tip 76. The tip retainer 72 includes a neck portion 74 which is threadedly secured within the bore 70 and threadedly carries the die tip 76 at its forward end. A nozzle 78 is mounted within the bore 70 ahead of, and spaced from the die tip 76. A front heater adapter 80 surrounds the nozzle 78 to transmit heat thereto from a heating element 82. The nozzle 78 includes a cylindrical orifice 84 and a conical face 86 expanding rearwardly from the orifice. The conical face 86 cooperates with a forwardly narrowing face 88 of the die tip 76 to form a passage which conducts the melt 66 to the orifice. It will thus be appreciated that the cartridge 50 and sleeve 60 together form a housing for the die tip retainer and the nozzle.

The above-described arrangement 50–88 is basically conventional in nature. In practice, the core 90 to be coated was passed directly through the die retainer, the die tip, and the nozzle 78.

In accordance with the present invention, a guide tube 92 is adjustably positioned within aligned through-bores of the tip retainer 72 and the die tip 76. The tube 92 can be formed of any suitable material such as stainless steel and may, for example, comprise a hypodermic syringe needle. The inside diameter of the tube is equal to or slightly larger than the core 90 which is to be coated. A mounting collar 94 is threadedly secured at the rear end of the tip retainer 72 and includes a through-bore which receives the tube 92. A set screw 96 is threadedly mounted in the rear end of the collar 94 so as to be movable into contact with the guide tube. By loosening the set screw 96, the guide tube 92 can be moved longitudinally relative to the die tip 76. By thus relocating the forward end of the guide tube the location of the point where the melt first contacts the core 90 can be varied.

In practice, the die assembly 30 can be utilized for either a pressure coating technique or a sleeve coating technique, by suitably positioning the front end of the guide tube 92. That is, by positioning the front end of the guide tube 92 upstream of the downstream end 98 of the nozzle orifice, i.e., preferably flush with the downstream end 100 of the through-bore of the die tip 76 as depicted in FIG. 4, the die assembly can be utilized in a pressure coating operation wherein the polymer melt 66 contacts the core 90 under pressure as the core travels from the downstream end 100 of the die tip 76 to the downstream end 98 of the nozzle. The outer diameter of the sheath or coating 102 will correspond to the diameter of the downstream end 98 of the nozzle orifice 84. The direction "upstream" is considered in relation to the direction of melt flow (i.e., "upstream" is to the left in FIG. 4).

If it is desired to convert the die assembly 30 for a sleeve-coating operation, it is merely necessary to loosen the set screw 96 and push the guide tube 92 forwardly beyond the die tip to a position closely adjacent to or flush with the downstream end 98 of the nozzle orifice 84, as depicted in FIG. 5. As a result, the polymer melt 66 does not make contact with the core 90 until, or just before, the core exits the nozzle orifice 84. Thus, the coating is not applied under pressure but rather is drawn-down down-stream of the nozzle orifice 84.

In the event that the core 90 should break, it can be rethreaded through the die assembly without the need to disassemble the latter. That is, the upstream end of the guide tube 92 is readily accessible for receiving a new core. Furthermore, even if the downstream end of the guide tube 92 becomes blocked with polymer, it is merely necessary to loosen the set screw 96 and push the guide tube 92 forwardly until the front end thereof exits the nozzle and is accessible for cleaning. Thereafter, the guide tube can be repositioned and fixed in place by the set screw 96.

It will thus be appreciated that the die assembly according to the present invention is advantageous in that it can be easily converted between pressure-coating and sleeve-coating modes by merely sliding the guide tube 92 forwardly or rearwardly to the desired location. Also, if the core breaks, the rear end of the guide tube is accessible for the receipt of a new core end and, if necessary, the guide tube can be pushed forwardly to be accessible for cleaning.

Although the present invention has been described in connection with a preferred embodiment thereof, it will be appreciated by those skilled in the art that additions, modifications, substitutions, and deletions, not specifically described, may be made without departing from the spirit and scope of the invention as defined in the appended claims.

What is claimed is:

1. A die assembly for the extrusion coating of elongate cores, comprising:
   a nozzle having an orifice therethrough,
   means defining a through-bore aligned with said orifice so that a core can be conducted through said through-bore and orifice,
   a passage arranged for conducting a flowable coating material into and through said orifice,
   a hollow guide tube slidably mounted in said through-bore and sized to receive the core,
      said slidable guide tube being positionable such that the forward end thereof is adjustably movable relative to said nozzle orifice to vary the location of the point at which the coating material contacts the core.

2. A die assembly according to claim 1 including adjustable means for securing said tube in selected positions of adjustment.

3. A die assembly according to claim 2, wherein said adjustable means comprises a threaded set screw.

4. A die assembly according to claim 1, wherein said means defining a through-bore comprises a die member which includes a die tip and a tip holder carrying said die tip.

5. A die assembly according to claim 1, wherein said forward end of said guide tube is positionable upstream of a downstream end of said nozzle orifice to effect a pressure coating of the core.

6. A die assembly according to claim 5, wherein said forward end of said guide tube is positionable substantially flush with a downstream end of said nozzle orifice to effect a sleeve coating of the core.

7. A die assembly according to claim 6, wherein said forward end of said guide tube is positionable downstream of said nozzle orifice to be exposed for cleaning.

8. A die assembly for the extrusion coating of a core such as an optical fiber and which is convertible between pressure coating and sleeve coating modes of operation, said assembly comprising:
- a housing,
- a nozzle mounted in said housing and having an orifice extending therethrough,
- a die member mounted in said housing and having a through-bore extending therethrough, said die member having a front tip situated closely adjacent said nozzle,
- passage means disposed between said front tip and said nozzle for conducting a flowable coating substance into said nozzle orifice,
- a hollow guide tube slidably positioned in said through-bore with a rear end of said guide tube projecting rearwardly beyond said die member, said guide tube being selectively slidable between:
  - a pressure coating mode in which a front end of said guide tube lies closely adjacent a downstream end of said through-bore, whereby the flowable coating substance contacts the core before exiting said nozzle orifice, and
  - a sleeve coating mode in which said front end of said guide tube lies closely adjacent a downstream end of said nozzle orifice such that the flowable coating substance contacts the core substantially at the place where the core exits said nozzle orifice, and
- means for releasably securing said guide tube in said pressure coating mode and said sleeve coating mode.

9. A die assembly according to claim 8, wherein said front end of said guide tube is positionable downstream of said nozzle orifice so as to be accessible for cleaning.

* * * * *